United States Patent [19]

Eberle et al.

[11] Patent Number: 4,602,195
[45] Date of Patent: Jul. 22, 1986

[54] INDUSTRIAL ROBOT HAVING INDIVIDUAL ELECTRICAL THREE-PHASE DRIVES

[75] Inventors: Manfred Eberle, Erlangen; Rudolf-Peter Hartmann, Oberasbach, both of Fed. Rep. of Germany

[73] Assignee: Mantec Gesellschaft für Automatisierungs- und Handhabungssysteme mbH, Fürth, Fed. Rep. of Germany

[21] Appl. No.: 593,855

[22] Filed: Mar. 27, 1984

[30] Foreign Application Priority Data

Apr. 12, 1983 [DE] Fed. Rep. of Germany ....... 3313167

[51] Int. Cl.$^4$ .............................................. G05B 11/12
[52] U.S. Cl. ..................................... 318/568; 318/87; 318/112
[58] Field of Search .................. 318/112, 87, 568; 363/71; 307/82

[56] References Cited

U.S. PATENT DOCUMENTS

| 3,444,450 | 5/1969 | Foppelmann | 318/813 |
| 3,768,001 | 10/1973 | Thorborg | 363/71 |
| 4,061,948 | 12/1977 | Lamparter | 318/112 |
| 4,263,535 | 4/1981 | Jones | 318/112 |
| 4,310,791 | 1/1982 | Akamatsu | 318/809 |
| 4,357,569 | 11/1982 | Iwakane et al. | 318/661 |

FOREIGN PATENT DOCUMENTS 2452345 5/1976 Fed. Rep. of Germany .

OTHER PUBLICATIONS

"Werkstatt und Betrieb", Jun. 1976, S. 305.
Siemens publication "Drehzahlveraenderbare Drehstromantriebe", No. E 319/1147, German and English versions.

*Primary Examiner*—David Smith, Jr.
*Attorney, Agent, or Firm*—Kenyon & Kenyon

[57] ABSTRACT

An industrial robot having permanently excited three-phase motors driving each robot joint is described. Each motor is coupled to a common intermediate d-c link through an individual controlled inverter. Electric braking energy of the motors is stored in a large capacitor battery coupled to the intermediate d-c link.

1 Claim, 2 Drawing Figures

INDUSTRIAL ROBOT HAVING INDIVIDUAL ELECTRICAL THREE-PHASE DRIVES

BACKGROUND OF THE INVENTION

The present invention relates to the field of industrial robots and particularly to an industrial robot having individual electrical three-phase drives for movements in the individual robot axes.

In electrical drives for the individual axes of industrial robots, d-c motors are generally used at present, for instance, in the form of disc rotor motors. See, for example, Werkstatt and Betrieb, 1976, page 305, or DE-OS No. 24 52 345. These d-c drives provide very good control but are, on the other hand, inferior in certain ways, for example, with respect to maintenance and weight, than comparable three-phase motors. If individual drives are used for each axis, for instance, in the case of a jointed robot, it will be understood that three-phase drives would offer advantages if it was possible to adapt such a drive system to the special requirements of robot operation.

SUMMARY OF THE INVENTION

It is therefore an object of the present invention to provide a drive system for a robot having rugged and reliable individual three-phase drives.

It is a further object to provide a drive system for the individual axes of a robot which can be accurately controlled, e.g. with respect to speed, acceleration and braking, and which furthermore operates in an energy-efficient manner.

These and other objects of the present invention are achieved by an industrial robot control system having a plurality of individual electrical three-phase drives for controlling movement in respective individual axes, each of said drives comprising permanently excited three-phase motor means for controlling movement around an axis, controlled converter means for a respective one of the motor means for supplying alternating current electrical energy to the motor means, intermediate direct current link means means for supplying direct current electrical energy to the controlled converter means, second converter means for supplying direct current electrical energy to the intermediate direct current link means from a three-phase alternating current network, and energy storage means coupled to the intermediate direct current link means, the energy storage means storing electric energy produced during dynamic braking of the three-phase motor means.

The present invention makes it possible to store the energy produced during dynamic braking in intermediate storage and to make it usable again later. For example, the energy of all drives may be fed back simultaneously, or individual drives may feed energy into the intermediate link or be supplied with energy therefrom at different times.

In a preferred embodiment, a large capacitor serves as the storage means. In this way, line voltage fluctuations are compensated and furthermore, in the event of a power system failure, energy is thus provided so that shut down can be accomplished in an orderly manner.

By using a capacitor as a storage means or battery, energy can be saved which would otherwise be converted into heat in braking resistors. Furthermore, no expensive and large converters which can transmit suddenly occurring major amounts of energy between the d-c link and the three-phase network are required.

In this regard, it should be noted that it is known per se to use voltage intermediate-link frequency converters which comprise two converters, for feeding synchronous threephase or squirrel cage-rotor motors and to provide a capacitor in the intermediate voltage link between the converters. See for instance, Siemens publication "Drehzahlveraenderbare Drehstromantriebe" No. E 319/1147, pages 22 and 23.

BRIEF DESCRIPTION OF THE DRAWINGS

The present invention will be explained in greater detail in the following detailed description, with reference to the drawings in which.

DETAILED DESCRIPTION

Figure 1:
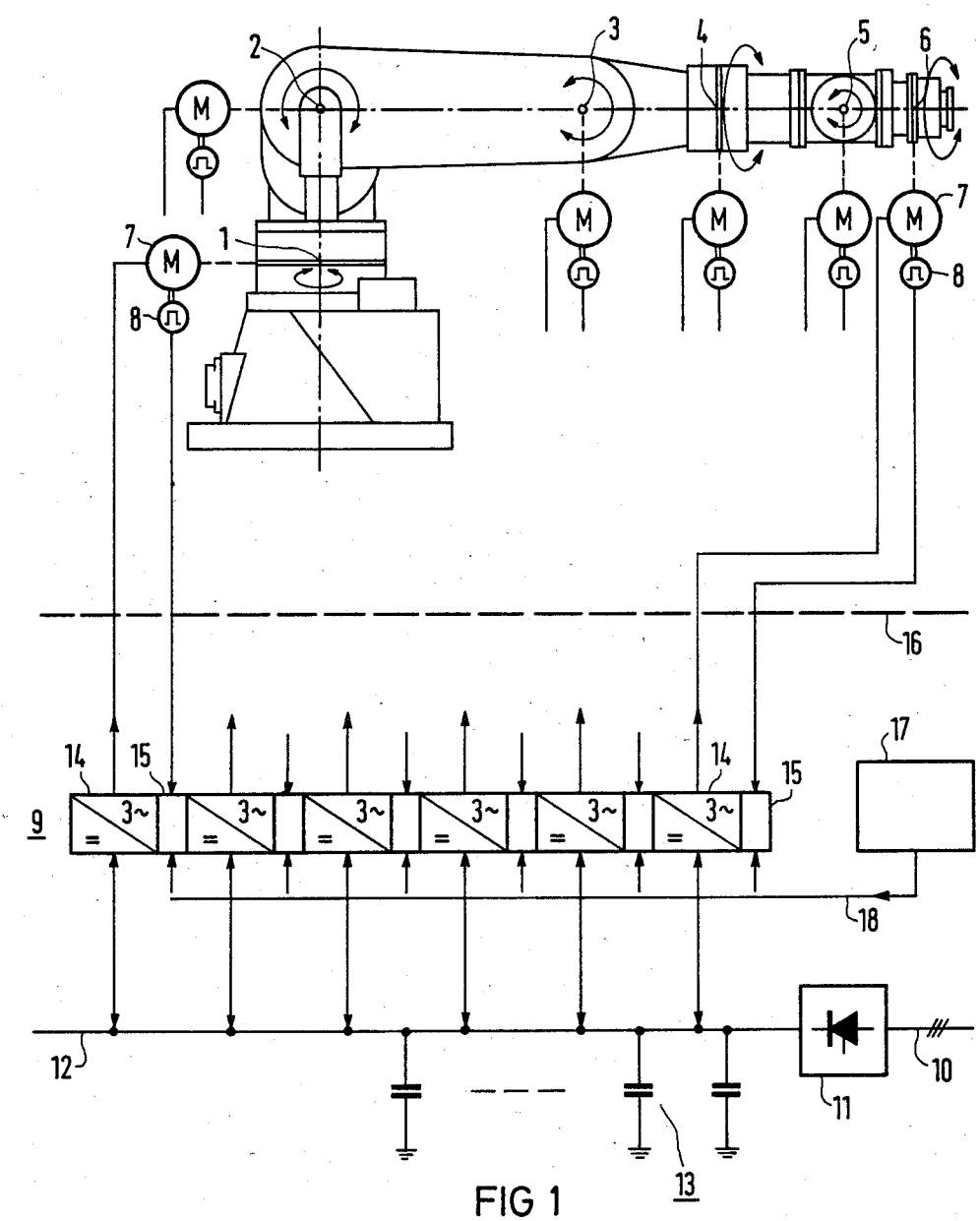
FIG. 1 is a schematic and block diagram illustrating how three phase drives in a jointed robot are supplied with power according to the present invention.

With reference now to the drawings, a jointed industrial robot is shown schematically in FIG. 1. The robot has six joints 1, 2, 3, 4, 5 and 6 by which rotation in six axes denoted by the circular arrows, is possible. According to the present invention, the motor for driving each joint is a permanently excited three-phase motor. The motors for the individual joints 1 to 6 are built integrally into the housing for the joint, together with the associated reduction gear transmission and travel distance pickups 8 provided for control purposes.

The system 9 provided for supplying power to the three-phase motors is arranged in a stationary control cabinet, and includes, as indicated by the broken line 16, a converter 11 which is connected to a three-phase network 10. Converter 11 converts the line voltage into a corresponding d-c voltage which is supplied to an intermediate d-c link 12. A large capacitor battery, shown as a plurality of capacitors 13, is associated with the intermediate d-c link and serves as an intermediate energy storage device. For each of the motors 7, a separate converter 14 is coupled to d-c link 12 which converts the voltage on the bus 12 into variable three-phase current. A control unit 15 is associated with each converter 14 which receives, as indicated by line 18, its control commands from a robot control unit 17. Control unit 15 also receives feedback control signals from travel distance pickup 8 disposed on the shaft of motor 7. In this manner, the individual motions in the individual axes can be separately and independently controlled.

As noted above, electric energy produced by the motors 7 during braking can be fed back simultaneously or at different times by suitable control of the converters 14. Energy fed into the intermediate d-c link in this way can be stored there to a sufficient degree in the capacitor battery 13.

Figure 2:
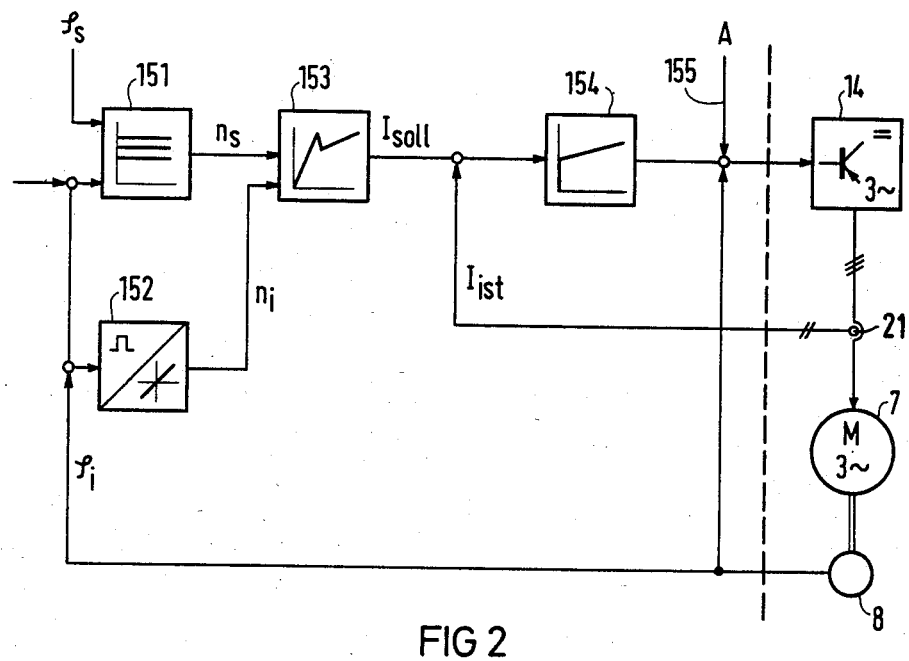
FIG. 2 is a block diagram showing the control portion of an individual converter which supplies power to a drive motor.

FIG. 2 shows details of the control unit 15 associated with each converter 14. Control unit 15 comprises a cascade controller for controlling the position speed of rotation and armature current of the three-phase motor 7. The actual value of the angle $p$ of a particular joint about its axis supplied by the travel distance pickup or transmitter 8 is compared with a desired angle value $p_s$, supplied by the robot control unit 17, in a position controller 151. The output of position controller 151 is the speed control variable $n_s$. Speed control variable $n_s$ is supplied to speed controller 153. Speed controller 153 receives an actual speed value $n_i$ from a converter 152 which determines the actual speed value from the change in angle position over time. The output variable of the speed controller 153, the current reference value $I_{soll}$ is then compared to the actual value of armature current $I_{ist}$ supplied to motor 7 by converter 14. This can be obtained from a current transformer 21. An error signal is then supplied to current controller 154. The output of controller 154 is supplied to the control input of converter 14, which may be a transistor inverter. Since in a jointed robot the movements in the individual axes also depend on the movement in the preceding axes, a correction factor A is additionally inserted at 155.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. An industrial robot control system having a plurality of individual electrical three-phase drives for controlling movement in respective individual axes, each of said drives comprising:

permanently excited three-phase motor means for controlling movement around an axis;

controlled converter means for a respective one of said motor means for supplying alternating current electrical energy to said motor means;

intermediate direct current link means for supplying direct electrical energy to said controlled converter means;

second converter means for supplying direct current electrical energy to said intermediate direct current link means from a three-phase alternating current network;

energy storage means coupled to said intermediate direct current link means, said energy storage means storing electric energy produced during dynamic braking of said three-phase motor means;

said controlled converter means further including cascade control means for controlling the position, speed and armature current of said three-phase motor means, said control means comprising first means for comparing an angular position of said robot about an axis with a desired value and for generating, as an output, a desired speed value, second means coupled to said first means for comparing an actual value of the speed of said motor with said desired speed value and for generating, as an output, a current reference value and third means for comparing said current reference value with an actual value of the motor current and for generating, as an output, a control signal, said control signal coupled to a control input of said controlled converter means.

* * * * *